United States Patent [19]

Yamashita et al.

[11] Patent Number: 5,200,906
[45] Date of Patent: Apr. 6, 1993

[54] WIRE-CUT ELECTRIC DISCHARGE MACHINING METHOD

[75] Inventors: Takahiko Yamashita, Ebina; Akira Busujima, Hadano; Toshiyuki Makino, Kawasaki, all of Japan

[73] Assignee: Hitachi Seiko Ltd., Ebina, Japan

[21] Appl. No.: 616,846

[22] Filed: Nov. 21, 1990

[51] Int. Cl.⁵ .................. G06F 15/46; B23H 7/08
[52] U.S. Cl. ..................... 364/474.04; 364/474.31; 219/69.12
[58] Field of Search ............. 364/474.04, 474.31; 219/69.12, 69.17

[56] References Cited

U.S. PATENT DOCUMENTS

| | | | |
|---|---|---|---|
| 3,731,044 | 5/1973 | Ullmann et al. | 219/69.12 |
| 4,843,203 | 6/1989 | Gamo et al. | 219/69.12 |
| 5,030,819 | 7/1991 | Borsari | 219/69.12 |

Primary Examiner—Jerry Smith
Assistant Examiner—Steven R. Garland
Attorney, Agent, or Firm—Antonelli, Terry, Stout & Kraus

[57] ABSTRACT

Ratios between a distance between an upper wire guide and the upper surface of a workpiece to be machined, a thickness of the workpiece and a distance between a lower wire guide and the lower surface of the workpiece are given to the inlet and outlet positions of a wire electrode at the upper and lower surfaces of the workpiece which have been interpolated so as to directly obtain displacement positions of the upper and lower wire guides, along which the upper and lower wire guides are moved successively, thereby obtaining an articles which is accurately machined with a relatively simple machining procedure.

1 Claim, 5 Drawing Sheets

WIRE-CUT ELECTRIC DISCHARGE MACHINING METHOD

BACKGROUND OF THE INVENTION

1. Field of the Invention

The present invention relates to a wire-cut electric discharge machining method by which the machining of a workpiece adapted to have a machined shape including a tapered surface with a continuously changing cone angle, the machining of a workpiece adapted to have different machined shapes at the upper and lower surfaces thereof, or the like can be carried out.

2. Prior Art

There have been well-known wire-cut electric discharge machining methods which can carry out the machining of a workpiece adapted to have a tapered surface with a continuously changing cone angle, such as those shown in FIG. 7 illustrating a workpiece having machined circular shapes at the upper and lower surfaces of a workpiece which are eccentric from each other, and as shown in FIG. 8 illustrating a workpiece having machined rectangular shapes at the upper and lower surfaces of a workpiece which are twisted with respect to each other, and the machining of a workpiece adapted to have different machined shapes at the upper and lower surfaces. For example, Japanese Laid-Open Patent No. 60-56842 discloses such a kind of wire-cut electric discharge machining methods.

However, the above-mentioned prior art suffers from a problem such that the arrangement of an apparatus and the content of a process (such as a machining program or the like) are complicated since interpolation is made at the position of a wire guide which usually circumscribes a complicated locus during machining and since shapes at the upper and lower surfaces of a workpiece are each decomposed into micro line segments which are then approximated to arcs or straight lines in order to carry a machining process, and further this process is carried out inevitably with a low degree of accuracy.

More specifically, if the workpiece is cut with the use of the above-mentioned prior art machining method along a line segment extending from points S1 to Sn on the upper surface of the workpiece and a line segment extending from points P1 to Pn on the lower surface of the workpiece, several points S1, S2, ... Sn, P1, P2, ... Pn are selected on both line segments, and then the positions U1, U2, ... Un, L1, L2 ... Ln of the upper and lower guides are obtained, corresponding to these points S1, S2 ... Sn, P1, P2 ... Pn. Then, interpolation is made between each adjacent points P1 and P2, U1 and U2, P2 and P3, U2 and U3, ..., and thereafter, the upper and lower guides are moved respectively along interpolating straight lines or curves therebetween. However, in the case of a machining process in which machined shapes at the upper and lower surfaces of a workpiece are different from each other, the above-mentioned points S1, S2, ... Sn, P1, P2, ... Pn should be selected in a large number in order to make distances between the adjacent points extremely short so as to ensure a high degree of accuracy for surfaces between the adjacent points since the loci of the upper and lower wire guides circumscribe curves which are more complicated than the loci on the upper and lower surfaces of a workpiece to be machined. Accordingly, a machining program for the above-mentioned prior art machining method should have had a large number of steps which occupy a substantial area of a memory device in an NC apparatus and which complicates the preparation of the machining program.

SUMMARY OF THE INVENTION

One object of the present invention is to provide a wire-cut electric discharge machining method with which a workpiece can be machined by use of an apparatus having a simple arrangement and a machining process with a simple content while the machining accuracy can be enhanced.

To the end, according to the present invention, there is provided a wire-cut electric discharge machining method comprising the steps of: preparing a workpiece to be machined having upper and lower surfaces; preparing path data by which shapes at the upper and lower surfaces of the workpiece are specified; calculating distances between the upper surface of the workpiece and an upper wire guide arranged above the workpiece, for guiding a wire electrode, between the upper and lower surfaces of the workpiece and between the lower surface of the workpiece and a lower wire guide arranged below the workpiece, for guiding the wire electrode, or calculating the ratios therebetween so as to compute displacement positions of the wire electrode on two planes corresponding to wire inlet and outlet end faces of the workpiece, and carrying out interpolation at those positions, thereby a desired shape as a whole can be obtained.

In view of the above-mentioned content of the wire-cut electric discharge machining method in which the displacement positions of the wire electrodes on two planes which correspond to the wire inlet and outlet end faces of the workpiece are computed, and interpolation is carried out at these positions so as to obtain a desired machined shape as a whole, there can be made a machining process even in the case of a workpiece having a machined tapered surface with a continuously changing cone angle and even in the case of a workpiece having different machined shapes at the upper and lower surfaces thereof, with the use of an apparatus having a simple arrangement and a process having a simple content.

The above-mentioned object, as well as others, and advantages of the present invention will become apparent after careful consideration is given to the detailed description of the presently preferred embodiment thereof with reference to the accompanying drawings in which:

DETAILED DESCRIPTION OF THE PREFERRED EMBODIMENT OF THE INVENTION

Figure 1:
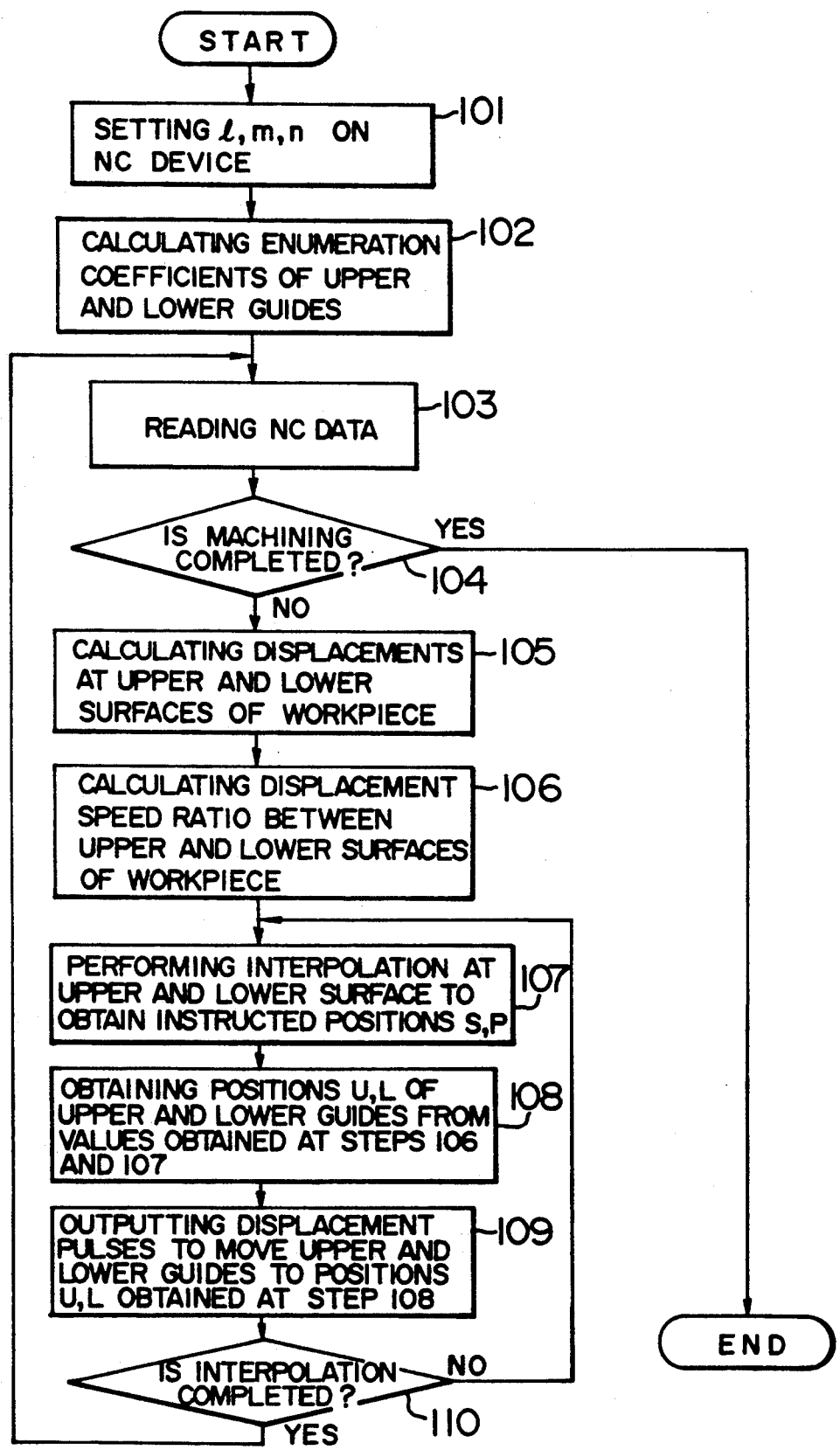
FIG. 1 is a view illustrating a flow chart of a wire electric discharge machining method in one embodiment form of the present invention.
Figure 2:
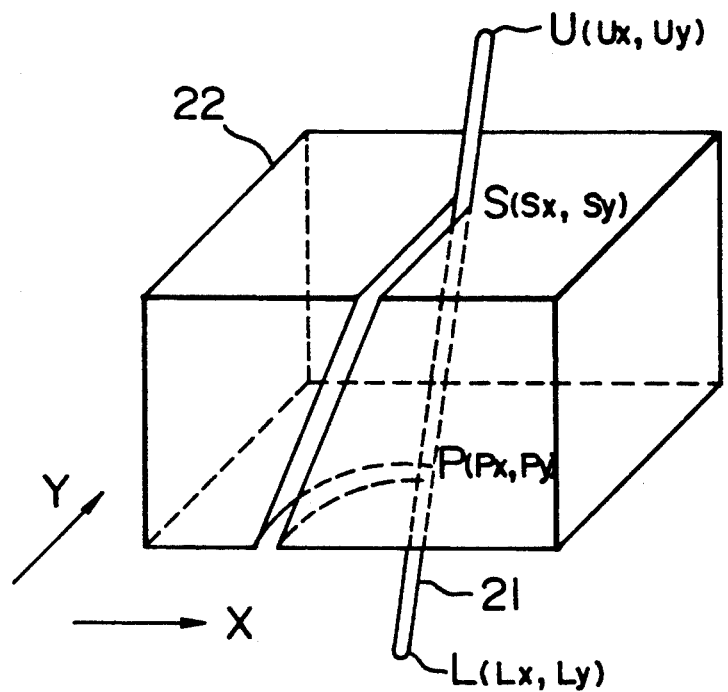
FIG. 2 is a conceptional view illustrating a workpiece to be machined by a method according to the present invention.

Referring to FIG. 1, a wire electric discharge machining method in one embodiment form of the present invention will be detailed, in which a straight line machining path is taken at the upper surface of a workpiece while an arc machining path is taken at the lower surface thereof as shown in FIG. 2.

It is noted here that a wire electric discharge machine can hardly set wire guides being made into contact with the workpiece due to its structure. Accordingly, during machining a tapered surface in the workpiece, the positional relationships between the upper surface of the workpiece and the position of the upper wire guide and the lower surface of the workpiece and the position of the lower wire guide are set as shown FIG. 3. That is, the upper and lower wire guides are moved, holding their reference points in the u- and v-planes, respectively.

Figure 3:
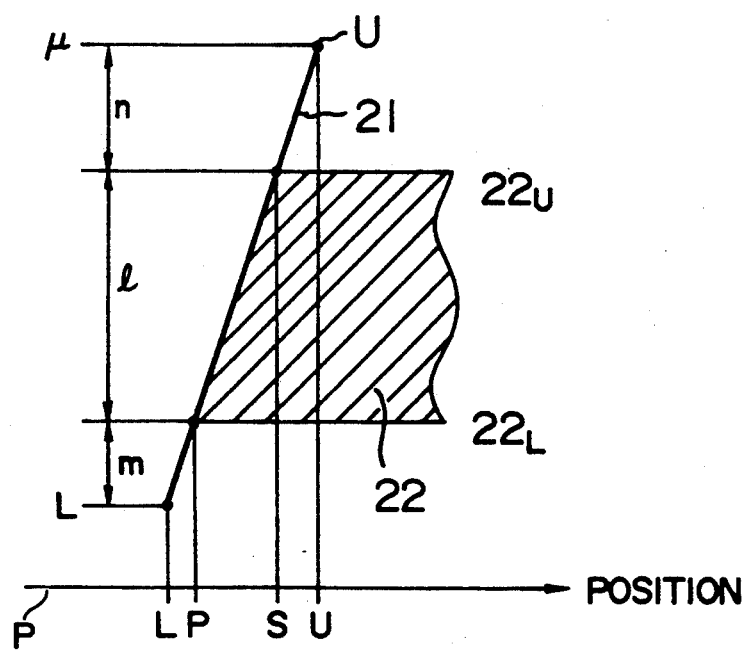
FIG. 3 is a view showing the positional relationship among components and parts.

Referring to FIGS. 2 and 3, there are shown a wire electrode 21 and a workpiece 22 having an upper surface 22U and a lower surface 22L. The wire electrode 21 emerges from the upper guide which is located at a position U into the lower guide which is located at a position L, passing through the workpiece while crossing the upper surface 22U at a position S and the lower surface 22L at a position P. Estimating the distance between the upper surface 22U and the lower surface 22L or the thickness of the workpiece 22 is l, and the distance between the lower surface 22L and the position L of the lower wire guide is m while the distance between the upper surface 22U and the position U of the upper guide being n, the above-mentioned positions L and U can be calculated by use of the following expressions:

$$L = P + (m/l)(P - S) \quad (1)$$

$$U = S - (n/l)(P - S) \quad (2)$$

In this case, (m/l) in expression (1) is called as an enumeration coefficient for the position of the lower wire guide while (n/l) in expression (2) is called as an enumeration coefficient for the position of the upper wire guide.

Figure 4:
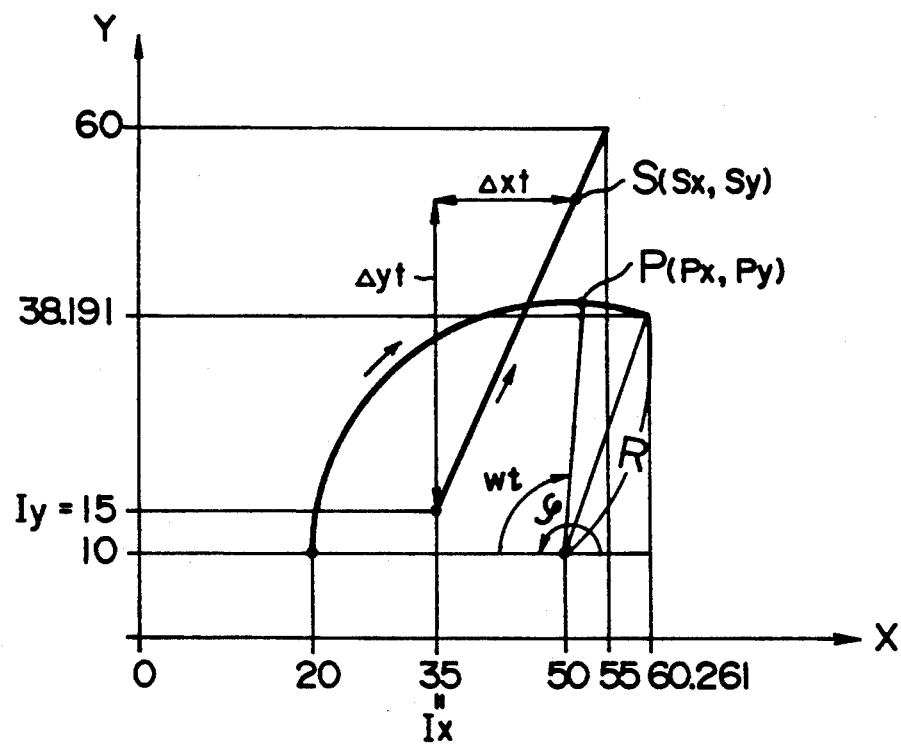
FIG. 4 is a view showing an X-Y coordinate plane on which machining paths are given.

Referring to FIG. 4 which shows machining path as one example on the X-Y coordinate plane fixed with respect to both upper and lower surfaces 22U, 22L of the workpiece 22, machining is made at the upper surface 22U along a straight line path extending from coordinates (35, 15) to coordinates (55, 60) while machining being made at the lower surface 22L along a clockwise arc extending from coordinates (20, 10) to coordinates (60.261, 38.191) about the coordinates (50, 10) as the center point thereof.

It is noted that the above-mentioned coordinates are non-dimensionalized or normalized for the sake of brevity.

Figure 5:
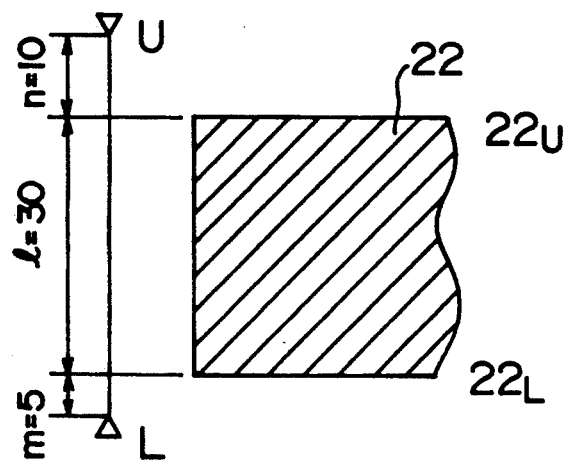
FIG. 5 is a partly broken cross-sectional view illustrating a workpiece to be machined.

Further, referring to FIG. 5, the relationship among the positions U, L of the upper and lower wire guides having the thickness l, and the upper and lower surfaces 22U, 22L of the workpiece 22 can be found. Estimating that the distance l between the upper and lower surfaces 22U, 22L or the thickness of the workpiece is 30 mm, the distance m between the lower surface 22L and the lower guide position L is 5 mm, and the distance n between the upper surface 22U and the upper guide position U is 10 mm.

In the machining procedure, at step 101, the values l, m, n are initially set to an NC apparatus (which is not shown). Enumeration coefficients for the positions of upper and lower wire guides are then obtained from the thus set values, and thereafter, from step 102 to 103, one block of NC data is read. After confirmation of thus read data which is not an instruction M02 for completion of a machining process, given at step 104, relative displacement values (which will be hereinbelow denoted simply as "displacement values") of the wire electrode 21 at the upper and lower surfaces 22U, 22L are calculated.

In this example, the displacement value at the upper surface 22U is obtained as follows:

$$\sqrt{(55 - 35)^2 + (60 - 15)^2} = 49.244 \quad (3)$$

Further, concerning the displacement value at the lower surface 22L which is an arc having a radius:

$$\sqrt{(50 - 25)^2 + (10 - 10)^2} = 30 \quad (4)$$

and having a center angle:

$$\tan^{-1}(10\text{-}10)/(50\text{-}20) - \tan^{-1}(10\text{-}38.191)/(50\text{-}60.261)$$
$$= 110 \text{ deg.} \quad (5)$$

the relative displacement at the lower surface 22L is obtained as follows:

$$2 \times 30 \times \pi \times 110/360 = 57.596 \quad (6)$$

Then, at step 106, the ratio between speeds of the wire electrode at the upper and lower surfaces 22U, 22L is obtained from the displacements at the upper and lower surfaces 22U, 22L which have been obtained by the expressions (3) and (6). Considering the lower surface 22L as a reference plane, the displacement speed at the upper surface 22U becomes 0.855 in this example when the displacement speed at the lower surface 22L is 1.

Next, at step 107, interpolation is made at the upper and lower surfaces 22U, 22L with the use of the ratio between displacement speeds so as to obtain instructed wire positions S, P at the upper and lower surfaces 22U, 22L, respectively, and then the upper and lower wire guide positions U, L upon initiation of the machining procedure are obtained by use of expressions (1) and (2) in accordance with the thus obtained instructed wire positions S, P and the enumeration coefficients (m/l), (n/l), that is, the coordinates of the upper and lower guide positions U, L are obtained as follows:

Concerning the lower wire guide position L:
X-coordinate value Lx = 20 + 5/30 × (20−35)
  = 17.5
Y-coordinate value Ly = 10 + 5/30 × (10−15)
  = 9.167

Concerning the upper wire guide position U:
X-coordinate value Ux = 35 − 10/30 × (20−35)
  = 40.0
Y-coordinate value Uy = 15 − 10/30 × (10−15)
  = 16.667

...(7)

Thus, displacement pulses corresponding to the wire guide positions U, L (coordinates) are outputted so as to move the upper and lower wire guides, and accordingly, the wire electrode 21 is moved, that is, the machining procedure from step 109 to 110 is carried out.

Estimating that the displacement value for every position loop sampling time of a digital servo is set to 5 along the machining path at the lower surface 22L, at the first sampling time, the wire electrode position at the lower surface 22U is given by (20.416, 14.977) while the wire electrode position at the upper surface 22U is given by (36.736, 18.906) since the displacement value at the upper surface 22U is given by multiplying 5 with 0.855.

The upper and lower wire guide positions U, L (coordinates) at this first sampling time can be obtained similarly to that obtained upon initiation of the machining procedure. That is, the lower wire guide position L is given by (17.696, 14.322) while the upper wire guide position U is given by (42.176, 20.216).

Similarly, the guide positions U, L (coordinates) at second, third, ... sampling times are obtained successively, and displacement pulses corresponding to these positions are outputted so as to move the upper and lower guides which therefore move the wire electrode 21, that is, the machining procedure from step 109 to 110 is carried out.

Figure 6:
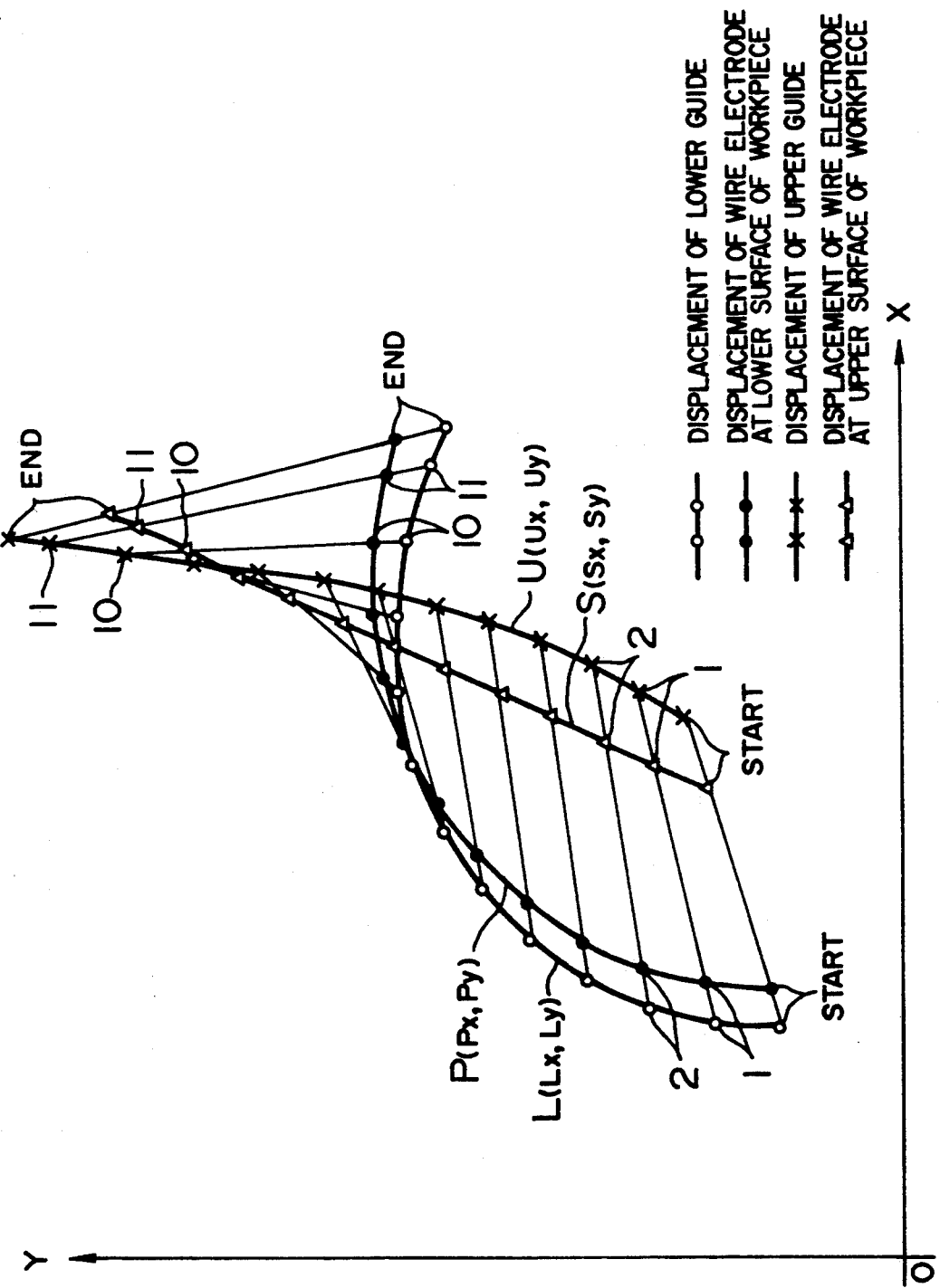
FIG. 6 is a view showing an X-Y coordinate plane on which machining paths taken by a wire electrode and wire guides are shown.
Figure 7:
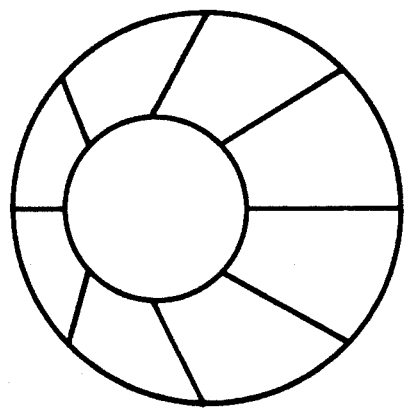
FIGS. 7 and 8 are plan views respectively illustrating machined shapes.
Figure 8:
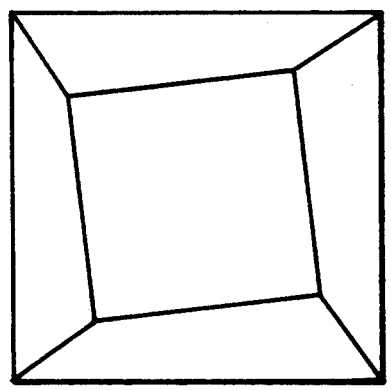

Table I shows the result of calculation from which a graph shown in FIG. 6 can be obtained.

TABLE 1

|  | Px | Py | Sx | Sy | Lx | Ly | Ux | Uy |
|---|---|---|---|---|---|---|---|---|
| START | 20.000 | 10.000 | 35.000 | 15.000 | 17.500 | 9.167 | 40.000 | 16.667 |
| 1 | 20.416 | 14.977 | 36.736 | 18.906 | 17.696 | 14.322 | 42.176 | 20.216 |
| 2 | 21.651 | 19.816 | 38.472 | 22.812 | 18.848 | 19.317 | 44.079 | 23.811 |
| 3 | 23.673 | 24.383 | 40.208 | 26.718 | 20.917 | 23.994 | 45.720 | 27.496 |
| 4 | 26.423 | 28.551 | 41.944 | 30.624 | 23.837 | 28.206 | 47.118 | 31.315 |
| 5 | 29.828 | 32.205 | 43.680 | 34.530 | 27.519 | 31.818 | 48.297 | 35.305 |
| 6 | 33.791 | 35.244 | 45.416 | 38.436 | 31.853 | 34.712 | 49.291 | 39.500 |
| 7 | 38.204 | 37.583 | 47.152 | 42.342 | 36.712 | 36.790 | 50.135 | 43.928 |
| 8 | 42.943 | 39.158 | 48.888 | 46.248 | 41.952 | 37.977 | 50.870 | 48.611 |
| 9 | 47.878 | 39.925 | 50.624 | 50.154 | 47.420 | 38.220 | 51.539 | 53.564 |
| 10 | 52.872 | 39.862 | 52.360 | 54.060 | 52.957 | 37.496 | 52.189 | 58.793 |
| 11 | 57.786 | 38.972 | 54.096 | 57.966 | 58.401 | 35.806 | 52.866 | 64.297 |
| END | 60.261 | 38.191 | 55.000 | 60.000 | 61.138 | 34.556 | 53.246 | 67.270 |

In view of the above-mentioned procedure, the machining shown in FIGS. 4 and 5 is carried out, which is completed when the machining end instruction M02 is delivered at step 104.

Further, explanation will be made of a variant form of the first embodiment.

In general, if the machining is made along an arc at the lower surface 22L, the locus of the wire electrode 21 which gives a machined shape at the lower surface 22L is given by the following expressions:

$$Px = R\cos(\phi + \omega t) \tag{8}$$

$$Py = R\sin(\phi + \omega t) \tag{9}$$

where R is radius, $\phi$ is initial phase and $\omega$ is angular velocity while t is time.

Further, in the case of a straight machining path at the upper surface 22U of the workpiece, the locus of the wire electrode 21 which gives a machined shape at the upper surface 22U, is given by the following expressions:

$$Sx = Ix + \Delta xt \tag{10}$$

$$Sy = Iy + \Delta yt \tag{11}$$

where Ix and Iy are coordinate values of a starting point, and $\Delta x$ and $\Delta y$ are velocity components while t gives time.

Substituting the expressions (8) to (11) into the above-mentioned expression (1), the locus of the lower wire guide can be obtained, that is, from the expression (1):

$$\begin{aligned} Lx &= Px + (m/l)(Px - Sx) \\ &= (1 + m/l)Px - (m/l)Sx \\ &= (1 + m/l)R\cos(\phi + \omega t) - (m/l)(Ix + \Delta xt) \end{aligned}$$
thus,
$$(1 + m/l)R\cos(\phi + \omega t) = Lx + (m/l)(Ix + \Delta xt) \tag{12}$$

and similarly, $$Ly = (1 + m/l)R\sin(\phi + \omega t) - (m/l)(Iy + \Delta yt)$$

thus, $$(1 + m/l)R\sin(\phi + \omega t) = Ly + (m/l)(Iy + \Delta yt) \tag{13}$$

From expressions (12), (13), $$\{Lx + (m/l)(Ix + \Delta xt)\}^2 + \{Ly + (m/l)(Iy + \Delta yt)\}^2 = [(1 + m/l)R]^2 \tag{14}$$

That is, it is known that the above-mentioned matter gives a circular equation having the center point, $\{-(m/l)(Ix + \Delta xt), -(m/l)(Iy + \Delta yt)\}$ and a radius of $(1 + m/l)R$, and the locus of the lower wire guide is exhibited by an arc given by the above-mentioned circular equation.

Meanwhile, by substituting expressions (8) to (11) into the above-mentioned expression (2), the position or the locus of the upper wire guide can be obtained. Namely, from expression (2):

$$\begin{aligned} Ux &= Sx - (n/l)(Px - Sx) \\ &= -(n/l)Px + (1 - n/l)Sx \\ &= -(n/l)R\cos(\phi + \omega t) + (1 + n/l)(Ix + \Delta xt) \end{aligned} \tag{15}$$

and similarly, $$Uy = -(n/l)R\sin(\phi + \omega t) + (1 + n/l)(Iy + \Delta yt)$$

Thus, $$-(n/l)R\sin(\phi + \omega t) = Uy - (1 + n/l)(Iy + \Delta yt) \tag{16}$$

From expressions (15), (16):

$$\{Ux-(1+n/l)(Ix+\Delta xt)\}^2+\{Uy-(1+n/l)(Iy+\Delta yt)\}^2=(nR/l)^2 \quad (17)$$

that is, it is known that the above-mentioned matter gives a circular equation having a center point $\{(1+n/l)(Iy+\Delta xt), (1+n/l)(Ix+\Delta yt)\}$ and a radius $(n/l)R$. The position or locus of the upper guide is exhibited by an arc given by this equation.

Accordingly, in an example shown in FIGS. 4 and 5:
l=30,
m=5,
n=10,
R=30,
Ix=35,
Iy=15,
$\Delta x=0.855\times 20/49.244=0.347$ and
$\Delta y=0.855\times 45/49.244=0.781$ By substituting the above-mentioned values in to the above-mentioned expressions (14), (17), thus, $$\{Lx+(5.833+0.058t)\}^2+\{Ly+(2.5+0.13t)\}^2=35^2 \quad (19)$$

$$\{Ux-(46.677+0.423t)\}^2+\{Uy-(20+1.041t)\}^2=10^2 \quad (20)$$

It is noted that the loci of the upper and lower wire guides can be obtained directly from the coordinates stuck to the upper and lower surfaces of a workpiece in a relatively simple manner. Accordingly, no interpolation is required at the positions of the upper and lower guides. Thus, it is possible to reduce the number of program steps in a wire cut machining process It had been explained in the above-mentioned embodiment that the above-mentioned l, m, n are initially set on an NC device, and then the ratios therebetween (enumeration coefficients of the upper and lower guides) are obtained. However, the present invention is not limited to this fact. That is, for example, ratios between l, m, n, or numeration coefficients of the upper and lower guides may be initially set on the NC device.

According to the present invention, in the case of shapes to be machined at the upper and lower surfaces of a workpiece, which are a circle and a straight line, the loci of the upper and lower guides sometimes have complicated curves, respectively. However, according to the present invention, it is not necessary to interpolate at points on these complicated curves in the machining of the workpiece. Thus, according to the present invention, even with a machining process in which a complicated curve of the locus of the upper or lower guide has been conventionally divided into extremely small line segments, shapes to be machined at the upper and lower surfaces of a workpiece are directly inputted to an NC device so that a machining process giving an article having a continuously varying taper angle or having shapes at it upper and lower surfaces, which are different from each other, can be carried out by a relatively simple arrangement and a relatively simple machining program, and further, it is possible to enhance the machining accuracy.

Although the preferred embodiment of the present invention has been explained hereinabove, it is noted that the present invention should not limited to this embodiment, but it can be changed within the scope of the present invention as stated in the appended claims.

What we claim is:

1. A wire-cut electric discharge machining method in which a wire electrode supported by upper and lower wire guides between which a workpiece having an upper surface and a lower surface is held, is moved relative to said workpiece while electric discharge is effected between said wire electrode and said workpiece; comprising the steps of:

previously setting data concerning shapes to be machined at said upper and lower surfaces, a distance between said upper and lower surfaces, and a distance between said upper wire guide and said upper surface and a distance between said lower wire guide and said lower surface on an NC machine;

calculating ratios between said distances;

computing displacement positions of said wire electrode at said upper and lower surfaces, that is, inlet and outlet positions of said wire electrode from data giving said shapes to be machined;

interpolating said wire inlet and outlet positions at said upper and lower surfaces;

calculating displacement positions of said upper and lower wire guides from the thus interpolated inlet and outlet positions of said wire electrode and said ratios; and moving said upper and lower guides successively along said displacement positions of said upper and lower wire guides so as to machine said workpiece.

* * * * *